(12) United States Patent  (10) Patent No.: US 9,321,930 B2
Tsuzaka                    (45) Date of Patent:    Apr. 26, 2016

(54) WATER-BASED INK FOR INK-JET RECORDING AND INK CARTRIDGE

(71) Applicant: Brother Kogyo Kabushiki Kaisha, Nagoya-shi, Aichi-ken (JP)

(72) Inventor: Yuka Tsuzaka, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/661,239

(22) Filed: Mar. 18, 2015

(65) Prior Publication Data

US 2015/0275010 A1    Oct. 1, 2015

(30) Foreign Application Priority Data

Mar. 31, 2014 (JP) ................. 2014-072042

(51) Int. Cl.
G01D 11/00    (2006.01)
C09D 11/38    (2014.01)
C09D 11/322   (2014.01)
C08K 3/36     (2006.01)

(52) U.S. Cl.
CPC . *C09D 11/38* (2013.01); *C08K 3/36* (2013.01); *C09D 11/322* (2013.01)

(58) Field of Classification Search
None
See application file for complete search history.

(56) References Cited

U.S. PATENT DOCUMENTS

| | | |
|---|---|---|
| 5,554,739 A | 9/1996 | Belmont |
| 5,571,311 A | 11/1996 | Belmont et al. |
| 5,609,671 A | 3/1997 | Nagasawa |
| 5,630,868 A | 5/1997 | Belmont et al. |
| 5,672,198 A | 9/1997 | Belmont |
| 5,713,988 A | 2/1998 | Belmont et al. |
| 5,837,045 A | 11/1998 | Johnson et al. |
| 5,851,280 A | 12/1998 | Belmont et al. |
| 5,900,029 A | 5/1999 | Belmont et al. |
| 5,985,016 A | 11/1999 | Tsang et al. |
| 6,042,643 A | 3/2000 | Belmont et al. |
| 6,150,433 A | 11/2000 | Tsang et al. |
| 6,494,946 B1 | 12/2002 | Belmont et al. |
| 7,553,883 B2 | 6/2009 | Yatake |
| 7,819,962 B2 | 10/2010 | Gu |
| 8,016,404 B2 | 9/2011 | Kato et al. |
| 8,727,523 B2 | 5/2014 | Tamai et al. |
| 8,858,695 B2 | 10/2014 | Gu et al. |
| 2003/0095914 A1 | 5/2003 | Belmont et al. |
| 2004/0241348 A1 | 12/2004 | Koga et al. |

(Continued)

FOREIGN PATENT DOCUMENTS

JP    H083498 A    1/1996
JP    H11193361 A  7/1999

(Continued)

OTHER PUBLICATIONS

Mar. 13, 2015—(US) Co-pending U.S. Appl. No. 14/657,607.

(Continued)

*Primary Examiner* — Erica Lin
(74) *Attorney, Agent, or Firm* — Banner & Witcoff, Ltd.

(57) ABSTRACT

A water-based ink for ink-jet recording includes: a colorant containing a self-dispersible pigment; water; and fumed silica. The blending ratio of the fumed silica to the self-dispersible pigment may be not less than 0.2 and not more than 1 by weight. Using the self-dispersible pigment and the fumed silica in combination can satisfy improved optical density and an excellent discharge property.

5 Claims, 1 Drawing Sheet

(56) References Cited

U.S. PATENT DOCUMENTS

| | | |
|---|---|---|
| 2005/0034629 A1 | 2/2005 | Belmont et al. |
| 2006/0058420 A1 | 3/2006 | Yatake |
| 2007/0100023 A1 | 5/2007 | Burns et al. |
| 2007/0100024 A1 | 5/2007 | Gu et al. |
| 2008/0118657 A1* | 5/2008 | Taverizatshy et al. ........ 427/466 |
| 2008/0241398 A1 | 10/2008 | Kato et al. |
| 2009/0229489 A1 | 9/2009 | Gu |
| 2011/0011307 A1 | 1/2011 | Shakhnovich et al. |
| 2011/0249058 A1* | 10/2011 | Shibata et al. .................. 347/21 |
| 2012/0236066 A1 | 9/2012 | Tamai et al. |
| 2013/0224451 A1 | 8/2013 | Shiono et al. |

FOREIGN PATENT DOCUMENTS

| | | |
|---|---|---|
| JP | H11222573 A | 8/1999 |
| JP | 2000-513396 A | 10/2000 |
| JP | 2000-313830 A | 11/2000 |
| JP | 2001-115069 A | 4/2001 |
| JP | 2006-002141 A | 1/2006 |
| JP | 2006-159422 A | 6/2006 |
| JP | 2006-199968 A | 8/2006 |
| JP | 2007-246656 A | 9/2007 |
| JP | 2008-246821 A | 10/2008 |
| JP | 2009-513802 A | 4/2009 |
| JP | 2009-515007 A | 4/2009 |
| JP | 2011-510155 A | 3/2011 |
| JP | 2011-515535 A | 5/2011 |
| JP | 2012-087309 A | 5/2012 |
| JP | 2012-207210 A | 10/2012 |
| JP | 2013-181055 A | 9/2013 |
| WO | 9748769 A1 | 12/1997 |
| WO | 2007053563 A2 | 5/2007 |
| WO | 2009094178 A2 | 7/2009 |

OTHER PUBLICATIONS

Mar. 13, 2015—(US) Co-pending U.S. Appl. No. 14/657,674.

Oct. 9, 2015—(US) Notice of Allowance—U.S. Appl. No. 14/657,607.

Oct. 13, 2015—(US) Non-Final office Action—U.S. Appl. No. 14/657,674.

Feb. 26, 2016—(US) Notice of Allowance—U.S. Appl. No. 14/657,674.

\* cited by examiner

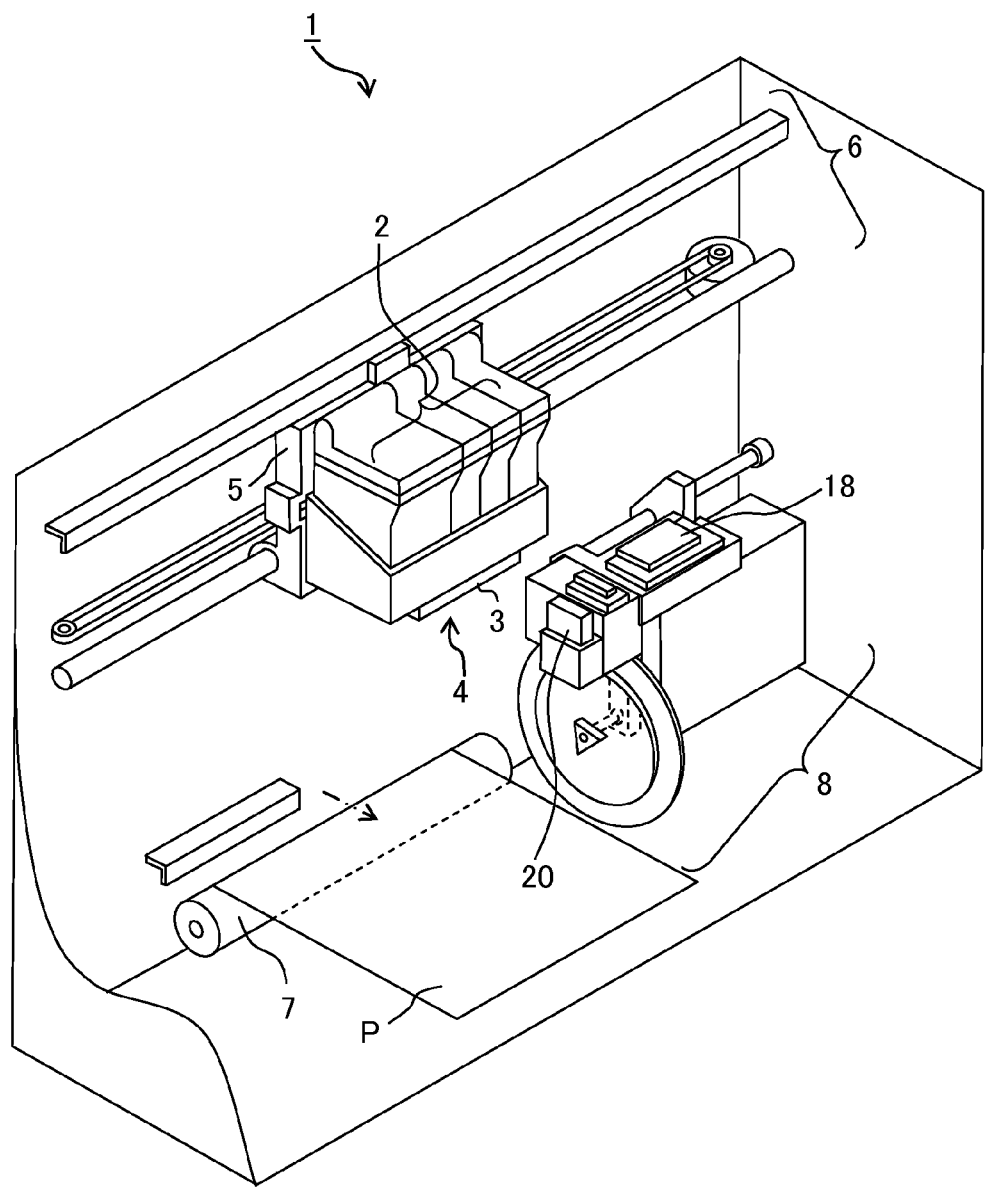

US 9,321,930 B2

WATER-BASED INK FOR INK-JET RECORDING AND INK CARTRIDGE

CROSS REFERENCE TO RELATED APPLICATION

The present application claims priority from Japanese Patent Application No. 2014-072042, filed on Mar. 31, 2014, the disclosure of which is incorporated herein by reference in its entirety.

BACKGROUND OF THE INVENTION

1. Field of the Invention

The present invention relates to a water-based ink for ink-jet recording and an ink cartridge.

2. Description of the Related Art

There has been suggested that a water-based pigment ink contains water dispersible polymer in order to improve optical density (OD value). Such a water-based pigment ink is disclosed, for example, in Japanese Patent Application Laid-open No. 2006-2141 and Japanese Patent Application Laid-open No. 2012-87309.

However, the water-based pigment ink containing the water dispersible polymer has such a problem that using the water dispersible polymer increases the viscosity of the water-based pigment ink to cause discharge failure easily. In view of this, an object of the present teaching is to provide a water-based pigment ink for ink-jet recording which can satisfy both improved optical density (OD value) and an excellent discharge property.

SUMMARY OF THE INVENTION

According to a first aspect of the present teaching, there is provided a water-based ink for ink-jet recording including: a colorant containing a self-dispersible pigment; water; and fumed silica.

The water-based ink for ink-jet recording of the present teaching obtained by using the self-dispersible pigment and the fumed silica in combination can satisfy both improved optical density (OD value) and an excellent discharge property.

According to a second aspect of the present teaching, there is provided an ink cartridge including the water-based ink for ink-jet recording as defined in the first aspect of the present teaching.

BRIEF DESCRIPTION OF THE DRAWINGS

FIG. 1 is a schematic perspective view of an exemplary construction of an ink-jet recording apparatus of the present teaching.

DESCRIPTION OF THE PREFERRED EMBODIMENTS

An explanation will be given about a specific example of a water-based ink for ink-jet recording of the present teaching. In the following, the water-based ink for ink-jet recording is referred as "water-based ink" or "ink" in some cases. The water-based ink includes a colorant, water, and fumed silica. The colorant contains a self-dispersible pigment. The self-dispersible pigment is dispersible in water without using any dispersant, owing to the fact that at least one of hydrophilic functional group such as sulfonic acid group, carboxylic acid group, and phosphoric acid group and the salt thereof is introduced directly or via any group into pigment particles by a chemical bond. Since the water-based ink of the present teaching contains the self-dispersible pigment, there is no possibility of the viscosity increase caused by a polymeric pigment dispersant, and the handling of the water-based ink of the present teaching is easy.

Those usable as the self-dispersible pigment include, for example, those in which the pigment is treated or processed in accordance with any method described, for example, in Japanese Patent Application Laid-open No. 8-3498 corresponding to U.S. Pat. No. 5,609,671, Published Japanese Translation of PCT International Publication for Patent Application No. 2000-513396 corresponding to U.S. Pat. No. 5,837,045, Published Japanese Translation of PCT International Publication for Patent Application No. 2009-515007 corresponding to United States Patent Application Publication Nos. 2007/0100023 and 2007/0100024, and Published Japanese Translation of PCT International Publication for Patent Application No. 2011-515535 corresponding to United States Patent Application Publication No. 2009/0229489. As for a material for the self-dispersible pigment, it is possible to use any of carbon black, inorganic pigments, organic pigments, and the like. The carbon black is exemplified, for example, by furnace black, lamp black, acetylene black, and channel black. The inorganic pigment is exemplified, for example, by titanium oxide, inorganic pigments based on iron oxide, and inorganic pigments based on carbon black. The organic pigment is exemplified, for example, by azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; aniline black daylight fluorescent pigment; and the like. In addition to the above pigments, it is possible to use any other pigment including, for example, Color Index (hereinafter referred to as C. I.) Pigment Black 1, 6, and 7; C. I. Pigment Yellow 1, 2, 3, 12, 13, 14, 15, 16, 17, 55, 78, 150, 151, 154, 180, 185, and 194; C. I. Pigment Orange 31 and 43; C. I. Pigment Red 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blue 1, 2, 3, 15, 15:1, 15:2, 15:3, 15:4, 16, 22, and 60; C. I. Pigment Green 7 and 36; and the like. A pigment which is especially suitable for the above treatment is exemplified, for example, by carbon black such as "MA8" and "MA100" produced by Mitsubishi Chemical Corporation and "Color Black FW200" produced by Degussa.

For example, any commercially available product may be used for the self-dispersible pigment. The commercially available product is exemplified, for example, by "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M", and "CAB-O-JET (trade name) 470Y" produced by Cabot Corporation; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink SC Holdings Co., Ltd.

The solid content blending amount (pigment solid content) of the self-dispersible pigment in the entire amount of the water-based ink is not particularly limited, and may be appropriately determined based on desired optical density or color (hue, tint), etc. The pigment solid content is, for example, in a range of 0.1% by weight to 20% by weight, preferably in a range of 2% by weight to 10% by weight, and more preferably in a range of 4% by weight to 6% by weight.

It is preferred that the self-dispersible pigment be a self-dispersible pigment modified by phosphoric acid group (hereinafter referred to as "phosphoric acid group-modified self-dispersible pigment"). It is possible to obtain the water-based ink of which optical density (OD value) is further improved by using the phosphoric acid group-modified self-dispersible pigment.

In addition to the self-dispersible pigment, the colorant may further contain any other pigment, dye, and the like.

It is preferred that the water be ion-exchanged water or pure water (purified water). The blending amount of water (water ratio) in the entire amount of the water-based ink is, for example, in a range of 10% by weight to 90% by weight, and preferably in a range of 40% by weight to 80% by weight. The water ratio may be, for example, the balance of the other components.

The water-based ink further contains fumed silica. Unlike colloidal silica produced by a wet method, the fumed silica is produced by a dry method (gas phase method).

The water-based ink of the present teaching obtained by using the self-dispersible pigment and the fumed silica in combination can satisfy both improved optical density (OD value) and an excellent discharge property. On the other hand, as indicated by comparative examples which will be described later, in a case that the colloidal silica is used instead of the fumed silica, the degree of improvement of optical density (OD value) is small. This mechanism is assumed, for example, as follows. That is, the fumed silica prevents contamination by impurities during manufacture more effectively than the colloidal silica, and thus the activity of surfaces of generated silica particles is high when the fumed silica is used. This enhances the reactivity with the self-dispersible pigment to allow the self-dispersible pigment to be easily remained or stayed on the surface of a recording medium such as recording paper. Thus, using the fumed silica is highly effective for improving the optical density (OD value). This mechanism, however, is just an assumption and the present teaching is not limited and restricted by this assumption. Noted that, although the water-based ink of the present teaching is required to contain the fumed silica, the water-based ink of the present teaching may contain other silica such as the colloidal silica within a range in which the effect of the present teaching is not deteriorated. Further, the water-based ink for ink-jet recording of the present teaching also has a secondary effect such that "strike-through (see-through) to the back surface of the recording medium" is prevented. The strike-through is that a recorded part with the water-based ink can be seen through the back surface when the recorded matter is seen from the back side (surface on the side opposite to the recorded surface).

The average particle diameter of the fumed silica is preferably 50 nm or more and 250 nm or less, and more preferably 150 nm or less. Using the fumed silica of which average particle diameter is 250 nm or less prevents clogging of nozzles of the ink-jet head. Using the fumed silica of which average particle diameter is not less than 50 nm can promote the effect of the fumed silica for infilling voids of paper fibers of the recording paper. Thus, the average particle diameter of the fumed silica is preferably 50 nm or more. The average particle diameter of the fumed silica can be measured as the arithmetic mean diameter, for example, by using a dynamic light scattering particle size analyzer "LB-550" manufactured by HORIBA, Ltd.

The blending amount of the fumed silica in the entire amount of the water-based ink is, for example, in a range of 0.1% by weight to 20% by weight, preferably in a range of 0.5% by weight to 10% by weight, and more preferably in a range of 1% by weight to 5% by weight.

It is preferred that the self-dispersible pigment and the fumed silica be contained in the water-based ink of the present teaching to satisfy the following condition (X).

$$7 \leq A+B \leq 10 \tag{X}$$

A: a blending amount of the self-dispersible pigment in the water-based ink (% by weight)

B: a blending amount of the fumed silica in the water-based ink (% by weight)

In a case that the sum (A+B) of blending amounts of the self-dispersible pigment and the fumed silica is less than 7% by weight, the optical density tends to be insufficient. In a case that the sum (A+B) exceeds 10% by weight, the ink discharge property tends to deteriorate.

It is preferred that the blending ratio of the fumed silica to the self-dispersible pigment satisfies the following condition (Y1).

$$A:B=5:1 \text{ to } 1:1 \tag{Y1}$$

In a case that the blending ratio of the fumed silica to the self-dispersible pigment is satisfies the above condition, the optical density is assumed to be improved for the following reason. That is, particles of the fumed silica infill the voids of the recording paper (i.e., the voids of paper fibers). This prevents the pigment from entering the inside of the recording paper through the voids of the paper fibers, so that the pigment remains on the paper surface. In a case that the blending ratio (B/A) of the fumed silica to the self-dispersible pigment is low ((B/A)<0.2), the effect for infilling the voids of paper fibers by the fumed silica can not be obtained enough. This causes the pigment to easily penetrate the inside of paper fibers. On the other hand, in a case that the blending ratio (B/A) is high ((B/A)>1), particles of the fumed silica are more likely to adhere to or around nozzles. This has a bad influence on the discharge property. The blending ratio of the fumed silica to the self-dispersible pigment preferably satisfies the following condition (Y2), and particularly preferably satisfies the following condition (Y3).

$$A:B=5:2 \text{ to } 1:1 \tag{Y2}$$

$$A:B=5:3 \text{ to } 1:1 \tag{Y3}$$

It is preferred that the water-based ink of the present teaching further contain a water-soluble organic solvent. The water-soluble organic solvent is exemplified, for example, by a humectant which prevents the water-based ink from drying at a nozzle tip portion of the ink-jet head and a penetrant which adjusts a drying rate of the water-based ink on the recording medium.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone;

1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that only one kind of the humectant as described above is used singly, or two or more kinds of the humectants are used in combination. Among the above-described humectants, it is preferable to use polyvalent alcohols such as alkylene glycol, glycerol, etc.

The blending amount of the humectant in the entire amount of the water-based ink is, for example, in a range of 0% by weight to 95% by weight, preferably in a range of 5% by weight to 80% by weight, and more preferably in a range of 5% by weight to 50% by weight.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. One kind of the penetrant as described above may be used singly, or two or more kinds of the penetrants as described above may be used in combination.

The blending amount of the penetrant in the entire amount of the water-based ink is, for example, in a range of 0% by weight to 20% by weight, preferably in a range of 0% by weight to 15% by weight, and more preferably in a range of 1% by weight to 4% by weight.

The water-based ink of the present teaching may further contain an acetylene glycol surfactant. The acetylene glycol surfactant is exemplified, for example, by the surfactant represented by the formula (1).

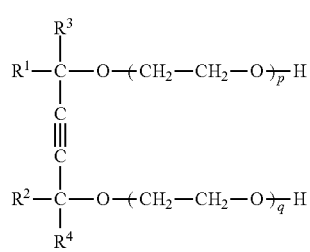
(1)

In the formula (1), p and q may be same or different from each other, and p and q are integers satisfying p+q=1 to 15 and are preferably integers satisfying p+q=3 to 11. Each of $R^1$, $R^2$, $R^3$, and $R^4$ is a straight or branched chain alkyl group having 1 to 5 carbon atoms, and $R^1$, $R^2$, $R^3$, and $R^4$ may be same or different from each other. The alkyl group is exemplified, for example, by methyl group, ethyl group, propyl group, isopropyl group, and butyl group.

For example, a commercially available product may be used as the acetylene glycol surfactant. The commercially available acetylene glycol surfactant is exemplified, for example, by "Olfine (trade name) E1010", "Olfine (trade name) E1004", "Surfynol (trade name) 440", and "Surfynol (trade name) 465" produced by Nissin Chemical Co., Ltd; and "Acetylenol (trade name) E40" and "Acetylenol (trade name) E100" produced by Kawaken Fine Chemicals Co., Ltd.

The blending amount of the acetylene glycol surfactant (specific surfactant ratio) in the entire amount of the water-based ink is, for example, in a range of 0.05% by weight to 10% by weight. By making the specific surfactant ratio 0.05% by weight or more, the wettability of the recording medium such as recording paper with the water-based ink is increased, which allows the water-based ink to spread over the recording medium easily. This further improves recording quality. Further, by making the specific surfactant ratio 10% by weight or less, it is possible to prevent the decrease in discharge property which would be otherwise caused, for example, under a condition that the nozzle surface of the ink-jet head is more likely to be wet with the water-based ink due to very low surface tension of the water-based ink. The blending amount of the specific surfactant in the entire amount of the water-based ink is preferably in a range of 0.1% by weight to 5% by weight, more preferably in a range of 0.2% by weight to 0.5% by weight.

The water-based ink may further contain a conventionally known additive, as necessary. The additive is exemplified, for example, by surfactants other than the acetylene glycol surfactant, pH-adjusting agents, viscosity-adjusting agents, surface tension-adjusting agents, and fungicides. The viscosity-adjusting agents are exemplified, for example, by polyvinyl alcohol, cellulose, and water-soluble resin. Further, it is preferred that the viscosity of the water-based ink is 3 mPa·s to 8 mPa·s.

The water-based ink can be prepared, for example, such that the colorant, water, the fumed silica, and optionally other additive component(s) are mixed uniformly in accordance with any conventionally known method, and undissolved matters are removed by a filter or the like.

It is possible to produce an ink cartridge by accommodating the water-based ink of the present teaching in an ink case. It is allowable to use any known ink case (body for ink cartridge) as the ink case (body) of the ink cartridge.

Next, an ink-jet recording apparatus and an ink-jet recording method of the present teaching will be explained.

The ink-jet recording apparatus of the present teaching is an ink-jet recording apparatus including an ink-accommodating section and an ink discharge mechanism, wherein an ink accommodated in the ink accommodating section is discharged by the ink discharge mechanism. The water-based ink for ink-jet recording of the present teaching is accommodated in the ink accommodating section. The ink accommodating section may be an exchangeable ink cartridge, as described above.

The ink-jet recording method of the present teaching is an ink-jet recording method for performing recording by discharging the water-based ink of the present teaching on the recording medium by the ink-jet system.

The ink-jet recording method of the present teaching can be practiced by, for example, using the above ink-jet recording apparatus. The recording includes printing text (character, letter), printing image or picture, printing, etc.

FIG. 1 depicts the configuration of an example of the ink-jet recording apparatus of the present teaching. As depicted in FIG. 1, an ink-jet recording apparatus 1 includes four ink cartridges 2, an ink discharge mechanism (ink-jet head) 3, a head unit 4, a carriage 5, a driving unit 6, a platen roller 7, and a purge device 8 as main constitutive components or parts.

The four ink cartridges 2 contain four colors of water-based inks respectively, the four colors being yellow, magenta, cyan, and black. For example, the water-based black ink is the water-based ink for ink-jet recording of the present teaching. It is allowable to use commercially available water-based inks as the remaining inks other than the water-based black ink. The ink-jet head 3 disposed on the head unit 4 performs recording on a recording medium P (for example, a recording paper or recording paper sheet P). The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application Laid-open No. 2008-246821). The platen roller 7 extends in the reciprocating direction of the carriage 5 and is arranged to face or be opposite to the ink-jet head 3.

The purge device 8 sucks any unsatisfactory ink which contains air bubbles, etc. accumulated in the ink-jet head 3. As the purge device 8, it is possible to use, for example, a conventionally known purge device (see, for example, United States Patent Application Publication No. US 2008/0241398 A1 corresponding to Japanese Patent Application Laid-open No. 2008-246821).

A wiper member 20 is provided on the purge device 8, at a position on the side of the platen roller 7 such that the wiper member 20 is adjacent to the purge device 8. The wiper member 20 is formed to have a spatula form, and wipes a nozzle-formation surface of the ink-jet head 3 accompanying with the movement (reciprocating movement) of the carriage 5. In FIG. 1, a cap 18 is provided to cover a plurality of nozzles of the ink-jet head 3 which is returned to a reset position upon completion of the recording, so as to prevent the water-based ink from drying.

In the ink-jet recording apparatus 1 of this example, the four ink cartridges 2 are provided, together with the head unit 4, on one carriage 5. Note that, however, the present teaching is not limited to this. In the ink-jet recording apparatus 1, each of the four ink cartridges 2 may be provided on another carriage which is different from that for the head unit 4. Alternatively, each of the four ink cartridges 2 may be arranged and fixed inside the ink-jet recording apparatus 1, rather than being provided on the carriage 5. In such an aspect, for example, each of the four ink cartridges 2 and the head unit 4 which is provided on the carriage 5 are connected with a tube, etc., and each of the water-based inks is supplied from one of the four ink cartridges 2 to the head unit 4 via the tube.

An ink-jet recording using the ink-jet recording apparatus 1 is performed, for example, in the following manner. At first, a recording paper P is supplied or fed, for example, from a paper feeding cassette (not depicted in the drawings) arranged at a side of or at a position below the ink-jet recording apparatus 1. The recording paper P is introduced or guided between the ink-jet head 3 and the platen roller 7. Then, a predetermined recording is performed on the fed or introduced recording paper P with the water-based inks discharged from the ink-jet head 3. The water-based ink of the present teaching has an excellent discharge property. The recording paper P after the recording is discharged from the ink-jet recording apparatus 1. A recorded matter recorded with the water-based ink of the present teaching has high optical density (OD value). In FIG. 1, the feed mechanism and discharge mechanism for the recording paper P are omitted.

Although the apparatus depicted in FIG. 1 adopts an ink-jet head of the serial type, the present teaching is not limited to this. The ink-jet recording apparatus may be an apparatus adopting an ink-jet head of the line type.

EXAMPLES

Next, examples of the present teaching will be explained together with comparative examples. Note that the present teaching is not limited and is not restricted to the examples and the comparative examples which will be described below.

Examples 1-8 and Comparative Examples 1-5

Each of the water-based ink for ink-jet recording of Examples 1-8 and Comparative Examples 1-5 was obtained as follows. That is, respective components of Composition of Water-based Ink indicated in TABLE 1 except for a self-dispersible pigment were mixed uniformly, thereby obtaining an ink solvent. Subsequently, the ink solvent was added to the self-dispersible pigment dispersed in water, followed by being mixed uniformly. After that, the obtained mixture was filtrated by using a cellulose acetate membrane filter (pore size: 3.00 μm) produced by Toyo Roshi Kaisha, Ltd. Noted that the average particle diameters of particles of the components categorized as Component B in TABLE 1 were as follows.

CAB-O-SPERSE PG001: 200 nm to 300 nm
CAB-O-SPERSE PG002: 100 nm to 200 nm
PL-20: 320 to 420 nm
CHEMIPEARL 401W: 950 nm to 1050 nm

With respect to the water-based inks of Examples 1-8 and Comparative Examples 1-5, (a) optical density (OD value) measurement, (b) discharge property evaluation, and (c) overall evaluation were performed according to the following methods.

(a) Optical Density (OD Value) Measurement

An ink-jet printer MFC-J4510ON manufactured by BROTHER KOGYO KABUSHIKI KAISHA was used to record an image including a single-color black patch on a plain paper sheet, with a resolution of 600 dpi×300 dpi, by using each of the water-based inks of Examples 1-8 and Comparative Examples 1-5, thereby preparing each evaluation sample. The optical density (OD value) was measured at five points in each of the evaluation samples by using a spectrophotometric colorimetry meter "SpectroEye" manufactured by X-RITE INC., to obtain the average value. As the plain paper, "XEROX 4200" produced by XEROX CORPORATION was used.

(b) Discharge Property Evaluation

The ink-jet printer MFC-J4510N was used to perform a recording test by using each of the water-based inks of Examples 1-8 and Comparative Examples 1-5 immediately after a purge operation (suction of the water-based ink with a pump in a main body of the ink-jet printer MFC-J4510N) was performed for three times after the ink cartridge had been exchanged. Then, the percentage of nozzles through which the water-based ink was discharged with respect to all of the nozzles was obtained to make evaluation in accordance with the following criterion.

Discharge Property Evaluation and Evaluation Criterion

A: The percentage of nozzles through which the water-based ink was discharged with respect to all of the nozzles was 100% (The water-based ink was able to be discharged from all of the nozzles).

B: The percentage of nozzles through which the water-based ink was discharged with respect to all of the nozzles was not less than 90% and less than 100%.

C: The percentage of nozzles through which the water-based ink was discharged with respect to all of the nozzles was less than 90%.

(c) Overall Evaluation

The overall evaluation was performed on each of the water-based inks in accordance with the following criterion based on the results of (a) and (b).

Overall Evaluation and Evaluation Criterion

A: Optical density (OD value) was 1.25 or more and the evaluation result of the discharge property was "A".

B: Optical density (OD value) was 1.16 or more and less than 1.25, and the evaluation result of the discharge property was "A"; or optical density (OD value) was 1.20 or more and less than 1.25, and the evaluation result of the discharge property was "B".

C: Optical density (OD value) was 1.15 or less, or the evaluation result of the discharge property was "C".

The compositions of the water-based inks of Examples 1-8 and Comparative Examples 1-5 and the results of measurement and evaluation are indicated in TABLE 1 as follows.

TABLE 1

|  |  |  | EXAMPLES | | | | | | | |
|---|---|---|---|---|---|---|---|---|---|---|
|  |  |  | 1 | 2 | 3 | 4 | 5 | 6 | 7 | 8 |
| Water-based Ink Composition (% by weight) | A | CAB-O-JET (trade name) 200 (*1) | — | — | 5.0 | — | — | — | — | — |
|  |  | CAB-O-JET (trade name) 300 (*2) | — | 5.0 | — | — | 5.0 | 6.0 | 5.0 | 4.0 |
|  |  | Self-dispersible carbon black modified by phosphoric acid group (*3) | 5.0 | — | — | 5.0 | — | — | — | — |
|  |  | Dipropylene glycol propyl ether | 2.5 | 2.5 | 2.5 | 2.5 | 2.5 | 2.5 | 2.5 | 2.5 |
|  |  | Glycerol | 25.0 | 25.0 | 26.0 | 26.0 | 26.0 | 25.0 | 26.5 | 26.5 |
|  |  | Olfine (trade name) E1010 (*4) | 0.2 | 0.2 | 0.2 | 0.2 | 0.2 | 0.2 | 0.2 | 0.2 |
|  | B | CAB-O-SPERSE (trade name) PG001 (*5) | 5.0 | — | 5.0 | 3.0 | 2.0 | 5.0 | 1.0 | 5.0 |
|  |  | CAB-O-SPERSE (trade name) PG002 (*6) | — | 5.0 | — | — | — | — | — | — |
|  |  | PL-20 (*7) | — | — | — | — | — | — | — | — |
|  |  | CHEMIPEARL (trade name) 401W (*8) | — | — | — | — | — | — | — | — |
|  |  | Water | balance | balance | balance | balance | balance | balance | balance | balance |
| A + B |  |  | 10.0 | 10.0 | 7.0 | 7.0 | 7.0 | 11.0 | 6.0 | 9.0 |
| A:B |  |  | 1:1 | 1:1 | 1:1 | 5:3 | 5:2 | 6:5 | 5:1 | 4:5 |
| Optical density (OD value) |  |  | 1.30 | 1.27 | 1.25 | 1.25 | 1.22 | 1.30 | 1.17 | 1.24 |
| Discharge property |  |  | A | A | A | A | A | B | A | B |
| Overall evaluation |  |  | A | A | A | A | B | B | B | B |

|  |  |  | COMPARATIVE EXAMPLES | | | | |
|---|---|---|---|---|---|---|---|
|  |  |  | 1 | 2 | 3 | 4 | 5 |
| Water-based Ink Composition (% by weight) | A | CAB-O-JET (trade name) 200 (*1) | — | — | 5.0 | — | — |
|  |  | CAB-O-JET (trade name) 300 (*2) | — | 5.0 | — | 5.0 | 5.0 |
|  |  | Self-dispersible carbon black modified by phosphoric acid group (*3) | 5.0 | — | — | — | — |
|  |  | Dipropylene glycol propyl ether | 2.5 | 2.5 | 2.5 | 2.5 | 2.5 |
|  |  | Glycerol | 25.0 | 25.0 | 25.0 | 25.0 | 25.0 |
|  |  | Olfine (trade name) E1010 (*4) | 0.2 | 0.2 | 0.2 | 0.2 | 0.2 |
|  | B | CAB-O-SPERSE (trade name) PG001 (*5) | — | — | — | — | — |
|  |  | CAB-O-SPERSE (trade name) PG002 (*6) | — | — | — | — | — |
|  |  | PL-20 (*7) | — | — | — | 5.0 | — |
|  |  | CHEMIPEARL (trade name) 401W (*8) | — | — | — | — | 5.0 |
|  |  | Water | balance | balance | balance | balance | balance |
| A + B |  |  | 5.0 | 5.0 | 5.0 | 10.0 | 10.0 |
| A:B |  |  | — | — | — | 1:1 | 1:1 |
| Optical density (OD value) |  |  | 1.15 | 1.14 | 1.13 | 1.18 | 1.34 |
| Discharge property |  |  | A | A | A | B | C |
| Overall evaluation |  |  | C | C | C | C | C |

TABLE 1 (following) - LEGEND (*1): Self-dispersible carbon black modified by sulfonic acid group, produced by Cabot Corporation, carbon black concentration: 20% by weight
(*2): Self-dispersible carbon black modified by carboxylic acid group, produced by Cabot Corporation, carbon black concentration: 15% by weight
(*3): Prepared by a method described in Published Japanese Translation of PCT International Publication for Patent Application No. 2011-515535 or the like
(*4): Acetylene glycol surfactant (ethylene oxide (10 mol) adduct of diol), produced by Nissin Chemical Co., Ltd, active ingredient: 100%
(*5): Fumed silica produced by Cabot Corporation
(*6): Fumed silica produced by Cabot Corporation
(*7): Colloidal silica produced by FUSO CHEMICAL, CO., LTD.
(*8): Polyolefin aqueous dispersion produced by Mitsui Chemicals, Inc.

As indicated in TABLE 1, regarding each of the water-based inks of Examples 1 to 8, the improved optical density (OD value) and the excellent discharge property were both obtained. Regarding each of the water-based inks of Examples 1 to 4 obtained by adding the self-dispersible carbon black and the fumed silica to meet the condition (X): (7≤A+B≤10) and the condition (Y3): (A:B=5:3 to 1:1), the optical density (OD value) was remarkably improved and the discharge property was particularly good as compared with any of the water-based inks of Comparative Examples 1 to 3 prepared under the same conditions except that no fumed silica was added. When the optical density (OD value) of each of the water-based inks of Examples 1 to 3 was compared to the optical density (OD value) of any of the water-based inks of Comparative Examples 1 to 3 prepared under the same conditions except that no fumed silica was added, the water-based ink of Example 1 obtained by using the phosphoric acid group-modified self-dispersible pigment had the most improved optical density (OD value). According to the optical density evaluation of each of the water-based inks of Examples 1 to 8, it is understood that the degree of improvement of optical density is clearly depending on the blending ratio of the fumed silica to the self-dispersible carbon black (A:B).

Regarding each of the water-based inks of Comparative Examples 4 and 5 obtained by using the colloidal silica or the polyolefin aqueous dispersion instead of the fumed silica, the result of the discharge property evaluation was bad. Regarding the water-based ink of Example 6, the discharge property was inferior to those of Examples 1-5, 7, and 8. The reason thereof is considered as follows. That is, the total of contained amounts of the pigment and the fumed silica in the water-based ink of Example 6 was larger than that in each of the water-based inks of Examples 1-5, 7, and 8, which affected the discharge of the water-based ink from nozzles.

As described above, the water-based ink of the present teaching can satisfy both improved optical density (OD value) and an excellent discharge property. The way of use of the water-based ink of the present teaching is not particularly limited, and the water-based ink is widely applicable to various types of ink-jet recording.

What is claimed is:

1. A water-based ink for ink-jet recording comprising:
a colorant containing a self-dispersible pigment; water; and
fumed silica, wherein a blending amount A (% by weight) of the self-dispersible pigment and a blending amount B (% by weight) of the fumed silica satisfies the following conditions (i)-(iv) in the water-based ink:

$$4 \leq A \leq 6 \quad \text{(i)}$$

$$1 \leq B \leq 5 \quad \text{(ii)}$$

$$A:B = 5:3 \text{ to } 1:1 \quad \text{(iii)}$$

$$7 < A+B < 10 \quad \text{(iv)}.$$

2. The water-based ink for ink-jet recording according to claim 1, wherein an average particle diameter of the fumed silica is in a range of 50 nm to 250 nm.

3. The water-based ink for ink-jet recording according to claim 2, wherein the average particle diameter of the fumed silica is in a range of 50 nm to 150 nm.

4. The water-based ink for ink-jet recording according to claim 1, wherein the self-dispersible pigment is a self-dispersible pigment modified by a phosphoric acid group.

5. An ink cartridge configured to contain a water-based ink for ink-jet recording, wherein the water-based ink is the water-based ink for ink-jet recording as defined in claim 1.

* * * * *